US010819520B2

(12) United States Patent
Bharatam et al.

(10) Patent No.: US 10,819,520 B2
(45) Date of Patent: Oct. 27, 2020

(54) IDENTITY PROOFING OFFERING FOR CUSTOMERS AND NON-CUSTOMERS

(71) Applicant: Capital One Services, LLC, McLean, VA (US)

(72) Inventors: Vivek Bharatam, Aldie, VA (US); Meghnath Sharma, Chantilly, VA (US); Parvez Naqvi, Potomac, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/208,847

(22) Filed: Dec. 4, 2018

(65) Prior Publication Data

US 2020/0106611 A1    Apr. 2, 2020

Related U.S. Application Data

(60) Provisional application No. 62/739,702, filed on Oct. 1, 2018.

(51) Int. Cl.
    *H04L 9/32*            (2006.01)
    *G06Q 40/02*         (2012.01)
    (Continued)

(52) U.S. Cl.
    CPC .......... *H04L 9/3218* (2013.01); *G06F 21/602* (2013.01); *G06F 21/6245* (2013.01); *G06Q 40/025* (2013.01); *G06Q 50/265* (2013.01); *H04L 9/0844* (2013.01); *G06Q 2220/00* (2013.01)

(58) Field of Classification Search
None
See application file for complete search history.

(56) References Cited

U.S. PATENT DOCUMENTS

2006/0010487 A1*   1/2006   Fierer ..................... G06F 21/32
                                                                726/5
2006/0093138 A1*   5/2006   Durand ................. H04L 9/0844
                                                                380/44

(Continued)

FOREIGN PATENT DOCUMENTS

WO         2018143983 A1     8/2018

OTHER PUBLICATIONS

"Mathematical routines for the NIST prime elliptic curves," Apr. 2010, all pages. (Year: 2010).*

(Continued)

*Primary Examiner* — Jacob C. Coppola

(57) ABSTRACT

Various embodiments are generally directed to an identity proofing platform. The platform may receive, from a user, personally identifiable information (PII) related to a consumer and determine one or more verifications requested by the user. The verifications may be one or more of a government identification (ID) verification, a credit bureau verification, or a mobile network operator verification. The platform may send a SMS message to the consumer for consent approval and receive consent from the consumer. The platform may perform the one or more verifications, generate an identity proofing result based on the performed one or more verifications, encrypt the identity proofing result, and send the identity proofing result to the user.

14 Claims, 5 Drawing Sheets

(51) Int. Cl.
*G06Q 50/26* (2012.01)
*G06F 21/60* (2013.01)
*H04L 9/08* (2006.01)
*G06F 21/62* (2013.01)

(56) References Cited

U.S. PATENT DOCUMENTS

| | | | | |
|---|---|---|---|---|
| 2006/0155573 | A1* | 7/2006 | Hartunian | G06Q 30/04 705/26.1 |
| 2008/0215346 | A1* | 9/2008 | O'Cinneide | G06F 21/31 705/1.1 |
| 2015/0264023 | A1* | 9/2015 | Reno | H04L 63/08 726/7 |
| 2016/0080381 | A1* | 3/2016 | Hall | H04L 63/0884 726/7 |
| 2017/0140174 | A1* | 5/2017 | Lacey | G06F 21/6245 |
| 2017/0366348 | A1* | 12/2017 | Weimer | H04L 9/3247 |
| 2018/0005239 | A1* | 1/2018 | Schlesinger | G06Q 20/4014 |
| 2018/0025332 | A1* | 1/2018 | Huang | G06Q 20/325 705/71 |
| 2018/0124047 | A1 | 5/2018 | Fisher et al. | |
| 2018/0204280 | A1* | 7/2018 | Painter | G06Q 40/08 |
| 2018/0288033 | A1* | 10/2018 | Kamal | G06F 21/35 |

OTHER PUBLICATIONS

Zhou et al., "REST API Design Patterns for SDN Northbound API," 2014 28th ICAINAW, all pages. (Year: 2014).*

Network Working Group, RFC-2631 "Diffie-Hellman Key Agreement Method," 1999, all pages. (Year: 1999).*

J. Carretero, G. Izquierdo-Moreno, M. Vasile-Cabezas and J. Garcia-Blas, "Federated Identity Architecture of the European eID System," in IEEE Access, vol. 6, pp. 75302-75326, 2018, doi: 10.1109/ACCESS.2018.2882870.*

Patents Act 1977: Search Report under Section 17(5) for United Kingdom Application No. GB1914151.4 dated Mar. 23, 2020, 4 pages.

* cited by examiner

200

IDENTITY PROOFING OFFERING FOR CUSTOMERS AND NON-CUSTOMERS

CROSS-REFERENCE TO RELATED APPLICATIONS

This application claims priority to U.S. Provisional Application No. 62/739,702, filed Oct. 1, 2018, which is incorporated herein by reference in its entirety.

BACKGROUND

Know your customer, or KYC, is the process of an entity, such as a banking institution, verifying the identity of its customers and assessing potential risks of illegal intentions for the business relationship. For example, the entity may obtain the identity and address of the customers for the KYC process, which helps to ensure that the services offered by the business are not misused. The KYC process may be employed by entities of varying types and sizes for ensuring their agents, consultants, or distributors are anti-bribery compliant.

Currently, it is extremely difficult to find a cohesive, customizable, and secure identity proofing solution that sufficiently meets the needs of and accommodates the various identity verification policies implemented by multiple entities on the same platform as part of the KYC process. That may be because different KYC-related use cases for each entity may require different trust levels. Accordingly, there is a need for an identity proofing platform that offers a flexible, customizable, and highly secure way of performing verification procedures for different use cases on the same platform.

SUMMARY

Various embodiments are generally directed to an identity proofing platform. The identity proofing platform may receive, from a user, personally identifiable information (PII) related to a consumer and determine one or more verifications requested by the user. The verifications may be one or more of a government identification (ID) verification, a credit bureau verification, or a mobile network operator verification. The platform may send a SMS message to the consumer for consent approval and receive consent from the consumer. The platform may perform the one or more verifications, generate an identity proofing result based on the performed one or more verifications, encrypt the identity proofing result, and send the identity proofing result to the user.

DETAILED DESCRIPTION

Figure 1:
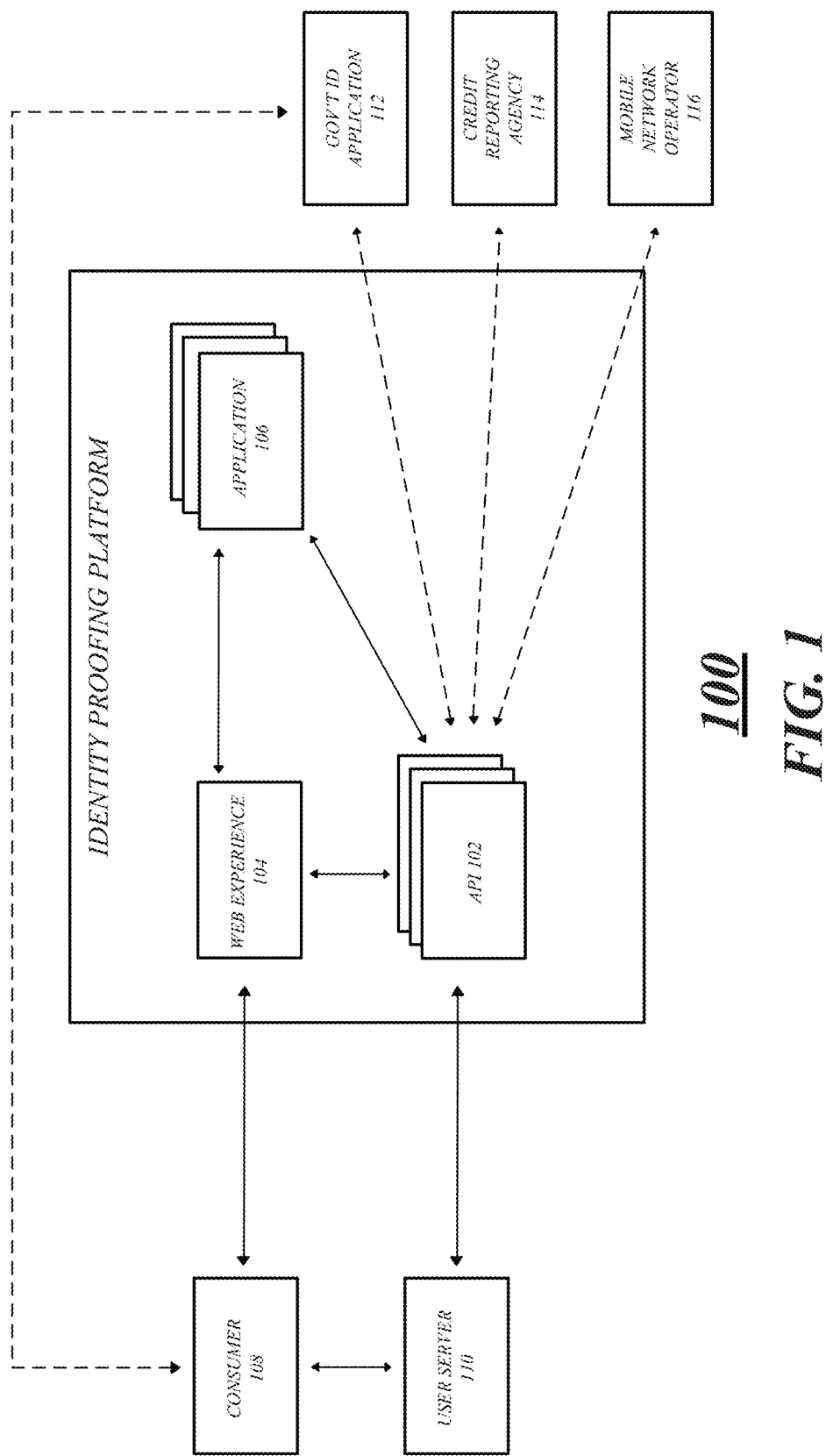
FIG. 1 illustrates an example identity proofing platform in accordance with one or more embodiments.

Various embodiments are generally directed to an identity proofing platform that enables a user, such a business entity, to verify the identity of a consumer (e.g., customers, non-customers) as part of a verification process (e.g., KYC, anti-money laundering (AML), consumer credit risk, social networking, anti-spamming, e-commerce transactions, etc.). For example, the identity proofing platform may receive identification information of the consumer and perform identity proofing based on one or more required verification levels identified or requested by the user. The identity proofing platform may be a "plug and play" platform-accommodating and performing identity proofing for various and different business use cases and for different users without adjustment or reconfiguration by the user. For instance, one user may require government identification verification and mobile network operator verification, as policy, while a second user may require only credit bureau verification. The platform can handle both types of proofing requests with the same architecture. In that regard, the platform is flexible, dynamic, and customizable to accept and process many forms of identity proofing.

According to embodiments, the identity proofing platform may include at least one application programming interface (API), which may be a representational state transfer (RESTful) API, and provide a web experience via a web application that takes a consumer through a flow-allowing the user to submit a government-issued identification document, verifying a mobile phone number, identifying risk scores obtained from one or more credit bureaus, etc. In examples, two or more APIs may be included in the platform, and depending on the proofing process, calls between the two or more APIs may be orchestrated.

Moreover, the identity proofing platform utilizes a secure cryptography mechanism to exchange personally identifiable information (PII) data of a user based on, for example, a derived key. In embodiments, the PII of the user is encrypted, for example, using a key agreement protocol, such as the Elliptic-curve Diffie-Hellman (ECDH) key agreement protocol. The curve of the ECDH protocol must be National Institute of Standards and Technology (NIST) P-384 for direct agreement on an Advanced Encryption Standard (AES)-192 encryption key. In examples, the AES 192 Galois/Counter Mode (GCM) algorithm may be used for data encryption. Further, the PII request object may be passed in the JSON Web Encryption (JWE) Compact Serialization format, as specified by Section 3.1 of the Request for Comments (RFC) 7516.

In embodiments, the ECDH public key may be rotated at a set or predetermined frequency or time interval, e.g., every 30 minutes, every 1 hour, every 24 hours, etc. In that regard, forward secrecy (FS) is obtained and gives assurances that the session keys will not be compromised even if a private key is compromised. The identity proofing platform may also follow the OAuth 2 standard and may be protected by a bot manager (e.g., Akamai Bot Manager) and a gateway (e.g., Dev X Gateway). According to examples, the APIs and web applications of the identity proofing platform are provisioned on a cloud infrastructure (e.g., AWS cloud infrastructure).

As set forth above, in previous solutions, one of the numerous problems with currently available KYC-related processes is that they are inflexible and do not accommodate different use cases or verification policies on the same product. In other words, identity proofing products are typically tailor-made for a specific type of use case or policy. The embodiments and examples described herein are advantageous over the previous solutions in numerous ways. For example, the identity proofing platform, using at least a plurality of APIs and web applications, is configured to dynamically accommodate numerous and various verification use cases all on the same platform or platform architecture. Moreover, advantageously, the platform is highly customizable in that numerous different services or applications may be plugged-in to (or unplugged from) the platform based on user needs or requirements. Another advantage is that the identity proofing platform is highly secure and mitigates the risk of sensitive data being compromised.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example identity proofing platform 100. As will be further discussed below, one or more computing devices, e.g., cloud-based server computers, or processing circuitry thereof, may be operable to execute instructions that support the features of the identity proofing platform 100.

As shown, the identity proofing platform 100 may include at least one API 102 (where additional APIs are represented by the cascaded blocks arranged behind the API 102), a web experience 104, at least one application 106 (where additional applications are indicated by the cascaded block arranged behind the application 106). The at least one API 102, web experience 104, and the at least one application 106 may programmatically interface or communicate with or connect among each other, as shown by the arrows. In embodiments, the APIs may be RESTful APIs.

A consumer 108 may connect to a user's website via a user server 110, where the user server 110 may then initiate an identity proofing process using the platform 100. For example, the at least one API 102 may receive from the user server 110 encrypted identification data associated with the consumer 108, such as first name, last name, home address, mobile telephone number, etc. Upon receiving the data, the platform 100 determines what verifications need to be performed or what verifications were requested. The verifications may include at least a government ID verification via a government ID application 112, a credit bureau verification via a credit reporting agency 114, and a mobile network operator verification via a mobile network operator 116. Based on the verifications requested by the user, the identity proofing platform 100 may dynamically access or call any one or more of the government ID application 112, the credit reporting agency 114, or the mobile network operator 116 to perform the verifications. In at least that regard, the platform 100 is customizable or flexible with respect to each specific user, as indicated by the dashed arrows. The same platform 100 works the same for one user that requires only a government ID verification, a second user that requires both a credit bureau verification and a mobile network operator verification, a third user that requires all three verification levels, and so on.

In examples, the identity proofing platform 100 allows the consumer 108 to directly submit identification information to the outside verification applications. As shown by the dashed arrow, the consumer 108 may submit government ID images directly to the government ID application 112, thereby allowing the at least one API 102 of the platform 100 to receive information related to those images from the government ID application 112 and then further process and/or analyze. Alternatively, and/or additionally, the consumer 108 may also provide information, give consent to various verifications, verify certain services, etc. to the identity proofing platform 100 itself by way of the web experience 104. Moreover, as will be further described below, the platform 100 may allow the consumer 108 to exchange of any personally identifiable information (PII) with the platform 100 or external applications or services, such as the above-described verification application, agency, and operator, in a highly secure manner.

Figure 2:
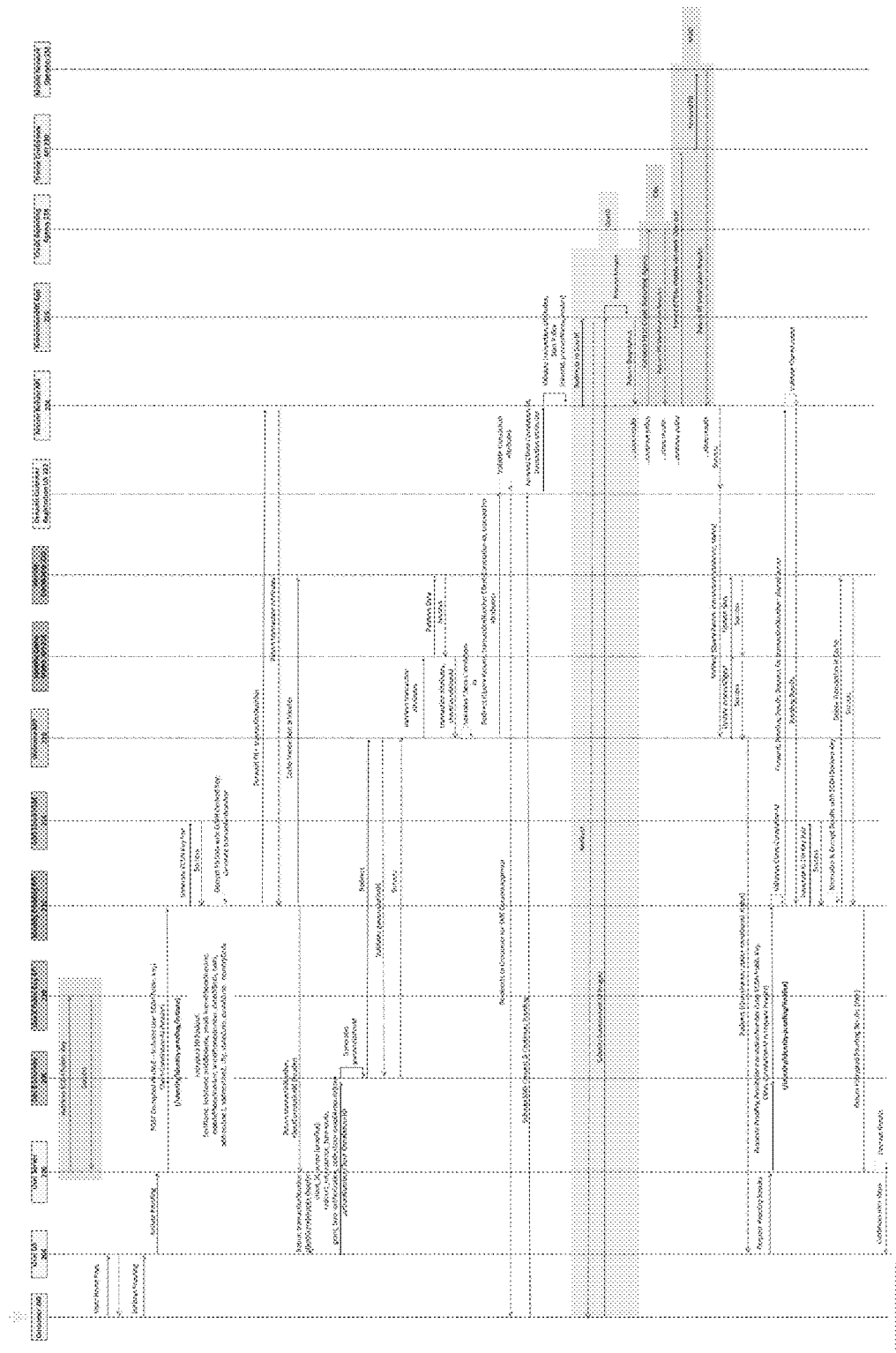
FIG. 2 illustrates an example sequence diagram in accordance with one or more embodiments.

FIG. 2 illustrates an example sequence diagram 200 of a proofing process via an identity proofing platform according to one or more embodiments. While the sequence diagram illustrates various interactions or communications between various components, it may be understood that the interactions and/or sequences are examples only, and the order in which the one or more interactions or communications are performed is not limited to the order shown.

As illustrated, there may be at least 16 different components in the sequence diagram 200: a consumer 202, a user experience (UX) 204, a user server 206, a gateway 208 (e.g., Dev X Gateway), a public key API 210 (e.g., Dev X public key API), an identity proofing API 212, a cloud-based hardware security module (HSM) 214 (e.g., AWS cloud HSM), a welcome application 216, an identity cache management API 218, a cloud-based identity in-memory datastore and cache 220 (e.g., Amazon ElastiCache), a dynamic customer registration UX 222, a master builder API 124, a government ID application 226, a credit reporting agency 228, a device confidence API 230, and a mobile network operator 232. The identity proofing platform, for instance, may include at least the identity proofing API 212 and the master builder API, along with user experiences and applications, such as the welcome application 216 and the dynamic customer registration UX 222. It may be understood the identity proofing platform may be configured similarly or identically to the identity proofing platform 100 illustrated in FIG. 1.

In embodiments, prior to offering the identity proofing by the identity proofing platform, the user may be required to certify the integration of its systems or servers to be used in the platform environment. A user (or otherwise known as a "client") may sign up for a DevExchange account on the DevExchange portal to integrate with the identity proofing platform, which may be used to access a user application. Once the user application has been registered, tested by the user, and is ready for live integration with the proofing platform, it may be authorized by the platform.

For example, the identity proofing API 212 may use client credentials OAuth flow (e.g., two-legged OAuth), to authorize the user application. In this flow, for instance, a client ID and a client secret that the user obtained during registration of the user application is exchanged for an access token by calling a retrieve access token API. The token may expire after two weeks, or the like. When invoking the identity proofing API 212, a value of the "access token" property that was returned in the response from the retrieve access token API may be passed as a bearer token in an authorization header in an API request. The client secret and the access token may be secured via a secure storage solution, e.g., stored in a database behind a firewall, encrypted with a 2048-RSA or higher, storing the RSA private key per corporate key management guidelines.

Before, or simultaneously during, the initiation of the identity proofing process, the user via the user server 206 may retrieve a DevExchange public key from the public key API 210 for use with an Elliptic-curve Diffie-Hellman (ECDH) key exchange. In examples, the public key may be rotated at a predetermined frequency or time interval. To start, the consumer 202 may visit the user's homepage via user UX 204 and an identity proofing process may be initiated, the request which is forwarded to a user server 206. As shown in FIG. 2, personally identifiable information (PII) associated with the consumer 202 may be packaged and passed to the identity proofing API 212. For example, the PII may include at least a first name, a last name, a middle name, an e-mail address, a home phone number, a mobile phone number, a work phone number, a date of birth, a tax identification number, one or more different types of addresses, associated cities, associated state codes, associated postal codes, and associated country codes. All PII or other types of personal information may be packaged as an encrypted JSON Web Token (JWE).

In examples, using the retrieved ECDH public key, an ECC keypair may be generated using a NIST P-384 curve, and then, a symmetric key may be derived from ECDH public key and the generated private key. The PII may be encrypted using the AES-192 GCM algorithm and may be passed in the JWE compact serialization format.

Upon receiving the encrypted PII package, the identity proofing API 212 generates an ECDH key pair and obtains confirmation of success or failure from the cloud HSM 214. The identity proofing API 212 may then decrypt the PII data in the package with the ECDH derived key and further generate a transaction number, which may be a unique transaction number associated with the proofing request. The transaction number and the PII are forwarded to the master builder API 224, which then forwards back to the identity proofing API 212 one or more transaction attributes, which may indicate necessary verification policies associated with the user that the consumer 202 need to meet or other suitable attributes related to the identity proofing process. The attributes may be then cached in the cloud-based identity in-memory datastore and cache 220. The API 212 may return the transaction number to the user server 206 with a client correlation ID (header) and where the user server 206 returns the same information to the user UX 204.

From the UX 204, various parameters are forwarded to the gateway 208. As shown, client_id may be the DevExchange client ID, redirect_uri may be the URI where the consumer 202 will be redirected after the identity proofing experience has completed and this value, for example, must match the value configured in the DevExchange, the grant_type may always be "authorization_code," scope may always be "proofing," response_type may always be "code," and the state may indicate a base64 encoded value comprised of a JSON object including the transaction number and the client correlation ID used or received during the associated initiate API call.

The gateway 208 may generate a gateway correlation ID represented by gwcorrelationid, redirect to the welcome application 216, which validates the gwcorrelationid, and returns a "success" indication to the welcome application 216. The welcome application 216 may then retrieve the transaction attributes stored in the cloud-based identity in-memory datastore and cache 220 and thereafter validates the client correlation ID and redirecting to the dynamic customer registration UX 222.

In embodiments, the UX 222 may request from the consumer 202 for a short message service (SMS) consent approval, whereby the consumer 202 then submits the SMS consent back to the UX 222 and continues the proofing process. For example, the SMS may include various links and the like to verify certain services. In some embodiments, notifications and consent approval may be made via other messaging services, including an in-app push notification and/or e-mail or automated voice services, for example. Thereafter, the UX 222 forwards the client correlation ID and the transaction attributes to the master builder API 224, which validates the transaction attributes and starts the identity proofing process. In at least that regard, based on the transaction attributes, for example, the identity proofing platform may determine which verifications to carry out and which identity proofing results to provide back to the user.

By way of example, the government ID application 226 may request the consumer 202 to provide at least one government ID image (e.g., image of driver's license, passport, etc.), which may be a digital image, and after receiving the at least one image, the application 226 processes images and returns identity or biographical information to the master builder API 224, which then stores the results. Moreover, the master builder API 224 may forward the PII associated with the consumer 202 to the credit reporting agency 228, which returns PII verification results and is stored by the master builder API 224. The mobile network operator 232 may also be called, in examples, for verification. The PII may be forwarded to the device confidence API 230 prior to forwarding it to the mobile network operator 232. The verification results are returned and stored.

Upon completion of the verifications, a "success" indication may be forwarded to the dynamic customer registration UX 222 and the welcome application 216 updates the processDigest parameter. Moreover, the data in the cache 220 may be updated.

The user UX 204 may request proofing results after it has received indication (or simultaneously receiving the indication) from the welcome application 216 of the status of the proofing process. A transaction number and a client correlation ID and/or a valid access token are provided. The identity proofing API 212 may request the proofing results stored in the master builder API 224, generate a ECDH key pair, normalize and encrypt the proofing results with the ECDH derived key, and at the same time or subsequently delete the transaction (or other suitable information or data) in the cache 220. The encrypted results are sent to the user server 206, where the proofing results are decrypted and analyzed.

It may be understood that the various interactions and steps illustrated in the sequence diagram 200 may be performed simultaneously or they may be staggered in time, as fit, at each of the numerous components. Moreover, while it may be understood that the user in the context of the example illustrated in FIG. 2 may be a financial institution and the consumer 202 its customer, the consumer may not be limited thereto and may also include non-customers or any other suitable persons that utilize the user's website and need to be compliant. Additionally, the user in the context of the example illustrated in FIG. 2 may be any entity (financial or non-financial) that wishes to perform validation/verification of its customers or non-customers or employees, alike—including any service providers, employers etc.

One of the numerous advantages of the above-described identity proofing platform is that the same platform can offer identity proofing to all sorts of users with different verification requirements and/or policies. The backend verification processes performed, for example, by the master builder API 224 as illustrated in FIG. 2, may be customized to meet the needs of the user—for instance, only the government ID verification may be performed if the transaction attribute(s)

define so, or perform all available verifications, and so on. Thus, the platform and its use of various APIs and applications render it extremely dynamic, for example, based on a key value proposition.

From the perspective of the user (e.g., user UX 204, user server 206), the following may be successfully performed on the identity proofing platform: (i) the user system can get an access token by passing the client ID and client secret, (ii) the user system may retrieve a public key, (iii) the user system can initiate identity proofing, (iv) the user system can redirect a consumer to start the identity proofing experience, (v) the user system "finalize" the identity proofing (e.g., successfully decrypt the proofing results), and (vi) the user system may be able to acquire a new token prior to the expiration of the old token.

Figure 3:
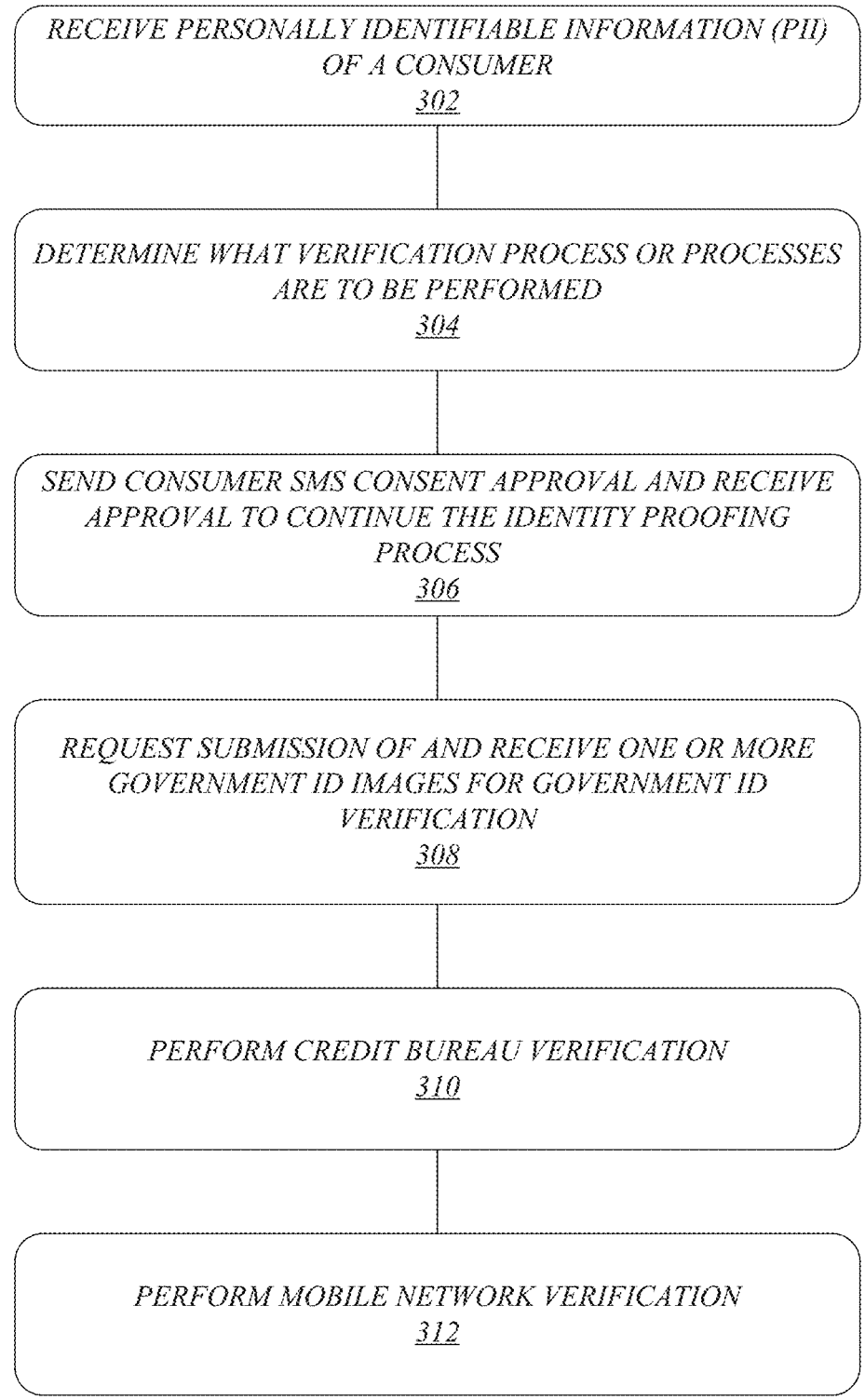
FIG. 3 illustrates an example flow diagram in accordance with one or more embodiments.

FIG. 3 illustrates a flow diagram 300 of identity proofing using an identity proofing platform in accordance with the embodiments. It may be understood that each block illustrated in the flow diagram 300 may be executed or implemented by one or more computing devices, and processing circuitries thereof, which will be further discussed below. Moreover, it will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments. Further, the blocks are not required to be arranged in any particular order.

In block 302, the identity proofing platform may receive PII of a consumer from a user server for initiating the identity proofing process. As set forth above, the PII may be encrypted and highly secure.

In block 304, the platform may ultimately determine what verification process or processes are to be performed for the proofing process, e.g., government ID verification, credit bureau verification, mobile network operator verification, etc. The determination may be based on the unique transaction (e.g., transaction number) that is being requested by the user and/or the attributes associated therewith (e.g., transaction attributes), and the like. The request may be made known to the platform in information transmitted thereto by the user server. It may be understood that one or more of the verification processes (government ID verification, credit bureau verification, mobile network operator verification, etc.) may call several different services and/or microservices that perform various aspects of the KYC, AML, etc. Moreover, the verification processes may be customizable, e.g., only certain services and/or microservices may be called or only certain PII may be sent (which may dictate which microservices are called).

In block 306, the consumer has control to start the proofing process, where an SMS or other notification or message is sent to the consumer and approval to proceed with the proofing process is received.

In block 308, a government ID verification may be performed by the identity proofing platform. The platform may request from the consumer one or more government ID images, e.g., digital images, for submission. The one or more acquired images may then be sent to a government ID verification agency, where the images may be processed and analyzed. In examples, there may be several microservices for providing government ID capture capabilities, and further performing certain validations on the government ID images prior to sending to any third party for verification. Based on the processing and analysis, various information, e.g., biological information, and other identity data may be sent back to the platform so that it can be compared with the PII provided by the consumer in block 302 for verification. Alternatively, the PII may be sent to the government ID verification agency along with the one or more government ID images of the consumer and the government agency may determine whether the verification is successful. It may be understood that the processing or analyzing of the government ID images may also be performed by the identity proofing platform, e.g., internally or in-house, and may not have to be sent to the government ID verification agency.

In block 310, a credit bureau verification may be performed by the identity proofing platform. The PII of the consumer may be sent to a credit reporting agency and may be compared with credit-related information associated with the consumer to determine any matches, e.g., home address match, name match, work address match, etc. Similarly, in block 312, a mobile network operator verification may be performed by the identity proofing platform. The PII of the consumer may be sent to a mobile network operator and may be compared with information associated with consumer on file to determine any matches, e.g., mobile phone number match, name match, home address match, etc. Thereafter, the identity proofing platform may encrypt and forward the proofing results to user.

While FIG. 3 shows three different verifications, it may be understood that the platform may select and perform only the verification(s) that the user instructed or requested the platform to perform. Alternatively, the platform may perform all of the different verification processes and provide the user only the results for the verifications that it requested. To that end, the same platform can handle multiple different proofing requests while also maintain its flexibility and customizability.

Figure 4:
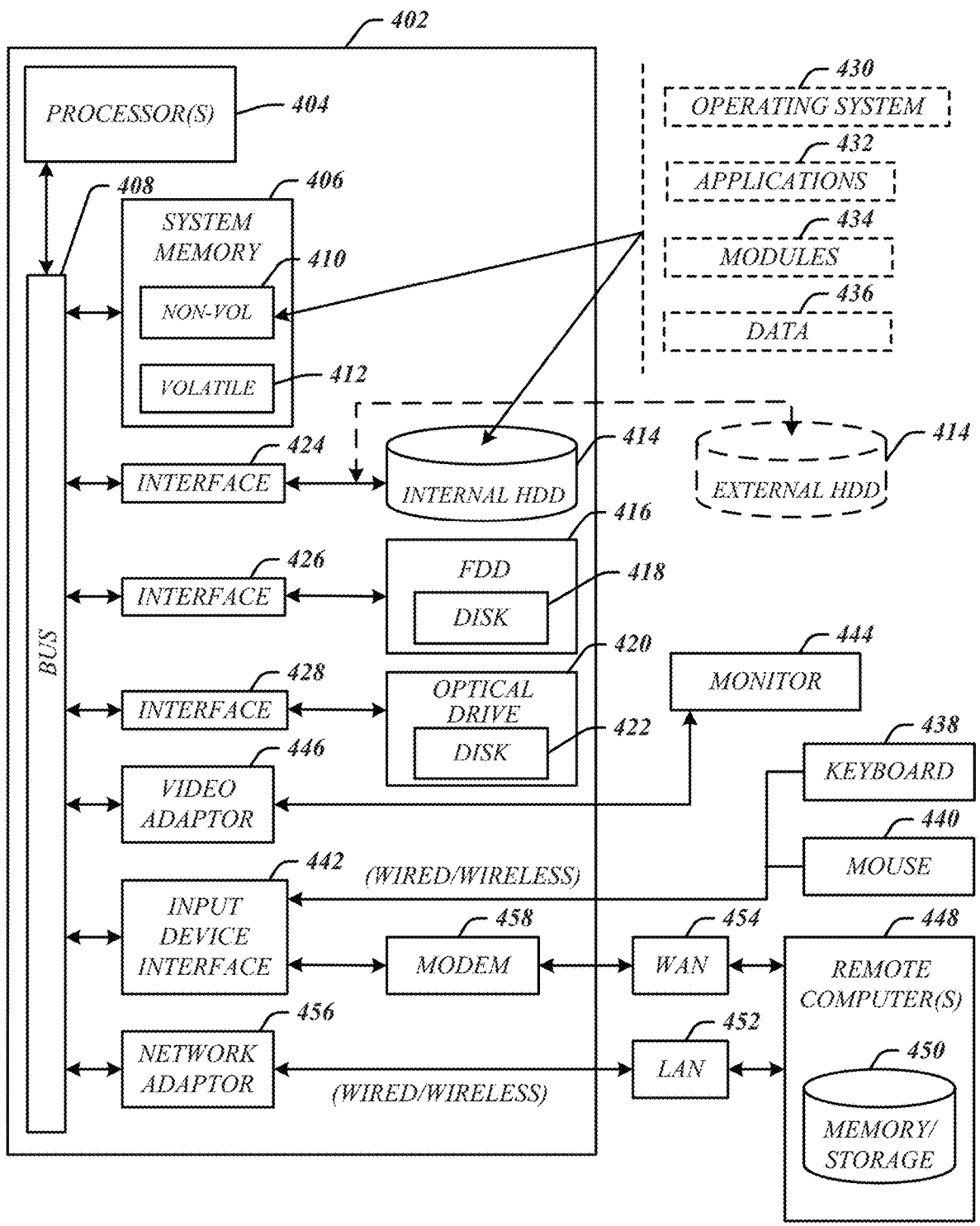
FIG. 4 illustrates an example computing architecture of a computing device in accordance with one or more embodiments.

FIG. 4 illustrates an embodiment of an exemplary computing architecture 400, e.g., of a computing device, such as a desktop computer, laptop, tablet computer, mobile computer, smartphone, etc., suitable for implementing various embodiments as previously described. In one embodiment, the computing architecture 400 may include or be implemented as part of a system, which will be further described below. At least one computing device and/or the processing circuitries thereof may be configured to provide the software components (e.g., APIs, applications, user experiences, flows) of the identity proofing platform and the functionalities thereof, as set forth above.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a computer 402 having a processor 404, a system memory 406 and a system bus 408. The processor 404 can be any of various commercially available processors, processing circuitry, central processing unit (CPU), a dedicated processor, field-programmable gate array (FPGA), etc.

The system bus 408 provides an interface for system components including, but not limited to, the system memory 406 to the processor 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by a HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 404 through an input device interface 842 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-3 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
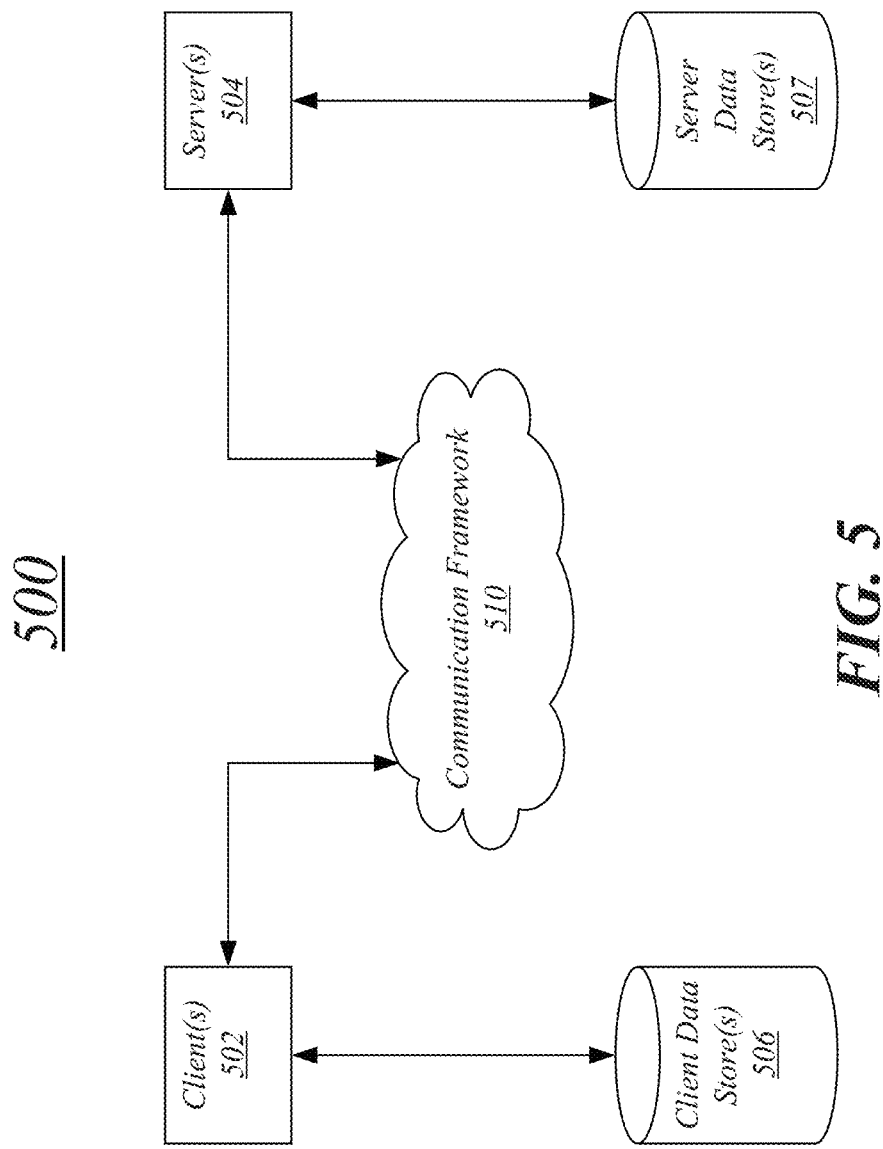
FIG. 5 illustrates an example communications architecture in accordance with one or more embodiments.

FIG. 5 is a block diagram depicting an exemplary communications architecture 500 suitable for implementing various embodiments. For example, one or more computing devices may communicate with each other via a communications framework, such as a network. At least one computing device connected to the network may be a consumer computing device, such as a desktop computer, laptop, tablet computer, smartphone, etc. At least one computing device connected to the network may be a server computer. The server computer or computers may be provisioned in a cloud architecture and may support the components (e.g., APIs, applications, user experiences, flows) and the functionalities of the identity proofing platform. In examples, the communication framework 510 may facilitate and support the communications and/or interactions between the proofing requesting users/consumers and the identity proofing platform.

The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500.

As shown in FIG. 5, the communications architecture 500 includes one or more clients 502 and servers 504. The one or more clients 502 and the servers 504 are operatively connected to one or more respective client data stores 506 and server data stores 507 that can be employed to store information local to the respective clients 502 and servers 504, such as cookies and/or associated contextual information.

The clients 502 and the servers 504 may communicate information between each other using a communication framework 510. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 502 and the servers 504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for an identity proofing platform, the system comprising:
   one or more computing devices, wherein the one or more computing devices comprises:
      a memory to store instructions; and
      processing circuitry, coupled with the memory, operable to execute the instructions, that when executed, cause the processing circuitry to:
         receive, via a first application programming interface (API), personally identifiable information (PII) related to a consumer from a user;
         decrypt the received PII with a derived key generated via the first API as part of a key pair corresponding to a key agreement protocol;
         generate, via the first API, a transaction number and send the transaction number to a second API different from the first API;
         determine one or more transaction attributes based on the transaction number wherein at least the one or more transaction attributes indicate one or more verifications required by the user to be performed, and wherein the second API performs only the one or more verifications indicated by the one or more transaction attributes;
         send a notification message to the consumer for consent approval;
         receive the consent approval from the consumer;
         call, via the second API, one or more verification systems corresponding to the one or more verifications required by the user to be performed based on the determined one or more transactions attributes, wherein the one or more verifications comprises a government identification (ID) verification, a credit bureau verification, and/or a mobile network operator verification;
generate an identity proofing result based on a result of each of the one or more verifications required by the user; and
encrypt, via the first API, the identity proofing result and send the identity proofing result to the user.

2. The system of claim 1, wherein the PII includes one or more of the following: (i) a first name of the consumer, (ii) a last name of the consumer, (iii) a middle name of the consumer, (iv) an e-mail address associated with the consumer, (v) at least one telephone number associated with the consumer, (vi) a date of birth of the consumer, (vii) a tax identification number associated with the consumer, (viii) one or more addresses associated with the consumer, (ix) one or more cities associated with the consumer, (x) one or more state codes associated with the consumer, (xi) one or more postal codes associated with the consumer, and (xii) one or more country codes associated with the consumer.

3. The system of claim 1, wherein the key agreement protocol is an Elliptic-curve Diffie-Hellman (ECDH) key agreement protocol, and wherein a curve associated with the ECDH key agreement protocol is National Institute of Standards and Technology (NIST) P-384 for direct agreement on an Advanced Encryption Standard (AES)-192 encryption key.

4. The system of claim 1, wherein the derived key is rotated at a predetermined frequency or a predetermined time interval.

5. The system of claim 1, wherein the first or second API is a representational state transfer (REST or RESTful) API.

6. The system of claim 1, wherein the first or second API is provisioned in a cloud infrastructure.

7. The system of claim 1, wherein the government ID verification comprises the processing circuitry to:
redirect to a government ID application via at least a third API to perform the government ID verification, wherein the government ID application instructs the consumer to submit at least one government ID image and processes the at least one government ID image;
receive identity or biographical information associated with the submitted at least one government ID image; and
compare the received identity or biographical information with the PII.

8. The system of claim 1, wherein the credit bureau verification comprises the processing circuitry to:
send the PII to a credit reporting agency via at least a third API; and
receive a credit bureau verification result from the credit reporting agency.

9. The system of claim 1, wherein the mobile network operator verification comprises the processing circuity to:
send the PII to a mobile network operator via at least a third API; and
receive a mobile network operator verification result from the mobile network operator.

10. The system of claim 1, wherein the processing circuitry is further caused to:
receive a request for the identity proofing result from the user, wherein the user specifies at least the transaction number;
determine whether the transaction number is valid; and
encrypt and send the identity proofing result to the user when the transaction number.

11. The system of claim 1, wherein the identity proofing platform simultaneously accommodates multiple users having different verification requirements or verification policies and generates identity proofing results for the multiple users.

12. The system of claim 1, wherein the one or more verifications is performed for one or more of the following: (i) know your customer (KYC), (ii) anti- money laundering (AML), (iii) consumer credit risk, (iv) social networking, (v) anti- spamming, and (vi) an e-commerce transaction.

13. The system of claim 1, wherein the user is a financial institution and the consumer is a customer of the financial institution.

14. A non-transitory computer-readable storage medium storing computer-readable program code executable by a processor to:
receive, via a first application programming interface (API), personally identifiable information (PII) related to a consumer, the PII being requested from the consumer on behalf of a user;
decrypt the received PII with a derived key based at least in part on the generated key pair generated via the first API as part of a key pair corresponding to a key agreement protocol;
generate, via the first API, a transaction number and send the transaction number to a second API different from the first API;
determine one or more transaction attributes based on the transaction number, wherein at least the one or more transaction attributes indicate one or more verifications required by the user to be performed, and wherein the second API performs only the one or more verifications indicated by the one or more transaction attributes;
send a notification to the consumer for consent approval;
receive the consent approval from the consumer;
call, via the second API, one or more verification systems corresponding to the one or more verifications required by the user to be performed based on the determined one or more transaction attributes, wherein the one or more verifications comprises a government identification (ID) verification, a credit bureau verification, and/or a mobile network operator verification;
generate an identity proofing result based on a result of each of the one or more verifications requested by the user; and
encrypt, via the first API, the identity proofing result and send the identity proofing result to the user.

* * * * *

UNITED STATES PATENT AND TRADEMARK OFFICE
CERTIFICATE OF CORRECTION

PATENT NO. : 10,819,520 B2  
APPLICATION NO. : 16/208847  
DATED : October 27, 2020  
INVENTOR(S) : Vivek Bharatam, Meghnath Sharma and Parvez Naqvi Page 1 of 1

It is certified that error appears in the above-identified patent and that said Letters Patent is hereby corrected as shown below:

In the Claims

Column 14, Claim 1, Line 56; Please replace "based on the transaction number wherein at least" with --based on the transaction number, wherein at least--

Column 16, Claim 12, Line 18; Please replace "(i) know your customer (KYC), (ii) anti- money laundering" with --(i) know your customer (KYC), (ii) anti-money laundering--

Column 16, Claim 14, Lines 31-32; Please replace "a derived key based at least in part on the generated key pair generated via" with --a derived key generated via--

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*